US005940350A

United States Patent [19]

Booty, Jr.

[11] Patent Number: 5,940,350

[45] Date of Patent: Aug. 17, 1999

[54] WATER-RESISTANT CLOCK WITH SUCTION CUPS

[76] Inventor: Donald J. Booty, Jr., 3803 N. Marshfield St., Chicago, Ill. 60613

[21] Appl. No.: 08/859,336

[22] Filed: May 20, 1997

[51] Int. Cl.[6] .......................... G04B 37/00; A45D 42/14; F16B 47/00

[52] U.S. Cl. ........................ 368/276; 368/316; 248/206.2

[58] Field of Search ....................... 368/88, 276, 86–287, 368/291, 292, 297–300, 309–317; 294/64.1; 248/205.5–206.4

[56] References Cited

U.S. PATENT DOCUMENTS

| | | | |
|---|---|---|---|
| 435,752 | 9/1890 | Ingersoll . | |
| 1,298,139 | 3/1919 | Wolcott . | |
| 2,708,338 | 5/1955 | Pfisterer | 368/291 |
| 3,355,874 | 12/1967 | Paratte | 368/291 |
| 4,505,598 | 3/1985 | Wolf et al. | 368/309 |
| 5,677,896 | 10/1997 | Nunes | 368/10 |
| 5,680,372 | 10/1997 | Flores et al. | 368/80 |

*Primary Examiner*—Vit Miska

*Attorney, Agent, or Firm*—Richard C. Litman

[57] ABSTRACT

A water-resistant clock with a plurality of double suction cups by which it may be retained on a smooth surface. A crystal is attached to the front casing with a front gasket. Three arms extend from the clock's casing, spaced apart on the clock's circumference at equal 120 degree angles. On the rear side of each arm is a double suction cup, by which the clock may be attached to a wall. Pull tabs on each suction cup make it easier to remove the suction cups, and thereby the clock, from the surface to which it is attached. The clock's rear casing is fastened to the front casing in a watertight manner. A back cover fits against a protruding rear circular gasket between the back cover and the rear casing to form a watertight seal. The rear gasket is partially covered by three outwardly extending arcuate prongs, which engage three inwardly extending arcuate prongs on the back cover, when the back cover is closed, creating a water-resistant seal that protects the clockworks. The suction cups should be made of rubber or flexible plastic such as polyvinyl chloride or an injection-molded elastomer, and be capable of retaining the clock on a smooth flat vertical surface for an extended period of time, as in a shower stall.

16 Claims, 4 Drawing Sheets

WATER-RESISTANT CLOCK WITH SUCTION CUPS

BACKGROUND OF THE INVENTION

1. Field of the Invention

The present invention relates to timepieces and, more specifically, to a water-resistant clock equipped with doubled suction cups by which it may be retained on a smooth planar surface.

2. Description of the Prior Art

For busy people, it is desirable to have a means of keeping track of the time when they are in an area where there is substantial moisture, and it is not convenient to wear an ordinary watch, as when they are taking a shower. The present invention is a water-resistant clock, with a plurality of doubled suction cups by which it may be attached to a smooth, flat surface, that may be wet, such as the wall of a shower stall. In the preferred embodiment, the clock has a circular main body, from which three arms of equal length extend radially outward, with a 120 degree angle between each arm, and with a doubled suction cup attached to the rear surface of each arm. While there are numerous previous inventions using suction cups, it will be seen that none are equivalent to the present invention, a water-resistant clock with a plurality of doubled suction cups.

U.S. Pat. No. 3,612,044, issued on Oct. 12, 1971, to Hector R. Gurrola, discloses a back massager, having a frame with a front surface from which a multiplicity of friction fingers extend, and a rear surface with a plurality of suction cups, by which it may be removably attached to a surface such as a wall. The instant invention is distinguishable, in that it is a water-resistant clock, not a back massager.

U.S. Pat. No. 4,848,542, issued on Jul. 18, 1989, to Richard Burnette and Barbara A. Mucker, discloses a package for retaining and mounting a mirror, with suction cups on both front and back surfaces, and an interior cavity in which the mirror can be stored. The instant invention is distinguishable, in that it is a clock rather than a mirror, and the suction cups are permanently attached to the clock itself, rather than merely being attached to a holder.

U.S. Pat. No. 4,944,049, issued on Jul. 31, 1990, to Robert Leonard, discloses an adjustable shower head and clock apparatus, retained on movable arms that are permanently attached to the wall. The instant invention is distinguishable, in that it is retained on a wall or other surface by suction cups.

U.S. Pat. No. 5,416,635, issued on May 16, 1995, to Thomas R. Christianson and Jeanne L. Christianson, discloses a portable condensation-free shower mirror, with a container that can be filled with hot water to prevent condensation of water vapor on the mirror, and with two suction cups on a rear surface, by which the mirror may be retained on a suitable surface. The instant invention is distinguishable, in that it is a clock, not a mirror.

U.S. Pat. No. 5,548,855, issues on Aug. 27, 1996, to Colleen J. Jackson, discloses a vanity for use with a bathtub, being a cabinet with a door that can also act as a tray, having suction cups on a rear surface, by which it may be retained on a wall over the bathtub. The instant invention is distinguishable, in that it is a clock, not a vanity or cabinet with a tray.

U.S. Pat. No. Des. 365,027, issued on Dec. 12, 1995, to Chin Y. Kuo, discloses a design for a bathroom clock, which may be waterproof, but does not have suction cups.

French Pat. No. 1,250,256, issued on Nov. 28, 1960, to Robert Bouchet, discloses a holder for a watch, in which the watch is enclosed, with a suction cup by which the holder can be retained on a suitable flat surface. The instant invention is distinguishable, in that it is a water-resistant clock, with a plurality of suction cups that are retained on the clock itself, not merely on a holder for the clock.

West German Pat. No. 1,955,059, to Karl Krug, published on May 19, 1971, discloses a battery powered clock with a transparent case, with a suction cup by which it can be retained on the picture tube of a television set. The instant invention is distinguishable, in that it is water-resistant, and has a plurality of suction cups.

PCT International Application WO 94/20006, to Gavin Giffard Lloyd Bradley, published on Sep. 15, 1994, discloses a device having a suction cup, and a cavity within which can be retained bathroom utensils, such as a toothbrush, razor, or shaving brush. The instant invention is distinguishable, in that it is a water-resistant clock having a plurality of suction cups.

None of the above inventions and patents, taken either singly or in combination, is seen to describe the instant invention as claimed.

SUMMARY OF THE INVENTION

The invention relates to a water-resistant clock with suction cups by which it may be retained on a smooth surface. In the preferred embodiment, three arms extend from the clock's casing, spaced apart on the clock's circumference at equal 120 degree angles. On the rear side of each arm is a doubled suction cup (an inner smaller diameter suction cup centered within the outer suction cup) by which the clock may be attached to a wall (vertical) or other suitable flat surface with the aid of a film of water. Pull tabs make it easier to remove the doubled suction cups, and thereby the clock, from the surface to which it is attached. The clock's rear casing is fastened to the front casing in a waterproof manner. A back cover fits against a circular gasket to form a watertight seal. Notches around the circumference of the generally cylindrical back cover make it easier to grip when turning it. Optional indicia indicate the direction in which the back cover should be turned: clockwise to close it; counter-clockwise to open it. Alternatively, the back cover could be configured so that it is turned counterclockwise to close it, and clockwise to open it. The gasket is partially covered by three outwardly extending arcuate prongs, which engage three inwardly extending arcuate prongs on the back cover, when the back cover is closed, creating a watertight seal that protects the clockworks. The doubled suction cups should be made of rubber or flexible plastic such as polyvinyl chloride, and be capable of retaining the clock on a smooth flat surface for an extended period of time, as in a shower stall.

Accordingly, it is a principal object of the invention to provide a clock that can be attached to a surface where moisture is present.

It is another object of the invention to provide a clock that can be attached to a surface by a plurality of doubled suction cups.

An additional object of the invention is to provide a clock with suction cups that are visible, and thus easily accessible for clock removal, yet integrated with the clock so as not to be visually dominant.

It is a further object of the invention to provide a water-resistant clock with a removable back cover.

Still another object of the invention is to provide a water-resistant clock with a back cover that can be removed by rotating it in a first direction, and can be replaced by rotating it in a second direction, opposite to the first direction.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a water-resistant clock with suction cups by which it may be retained on a smooth surface.

Figure 1:
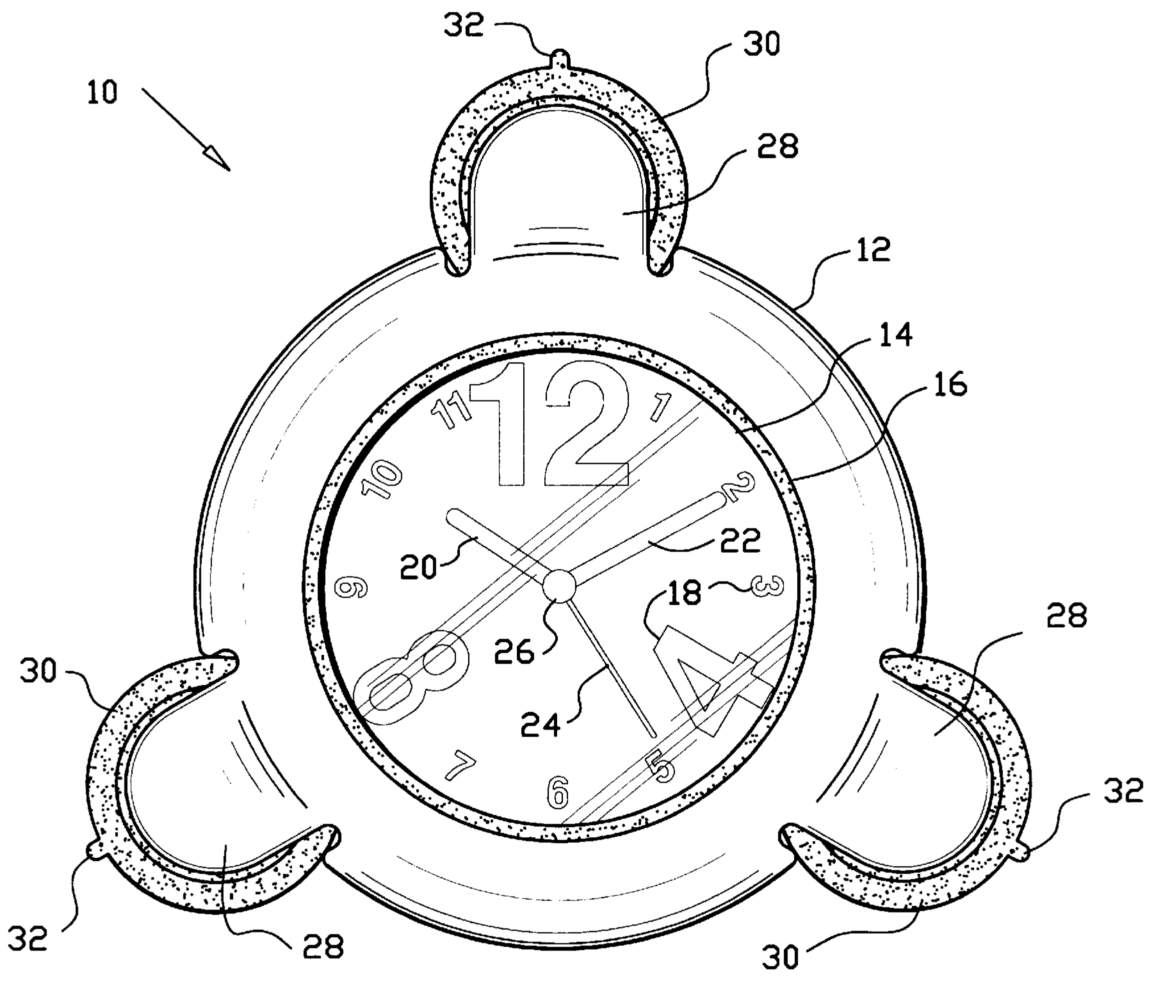
FIG. 1 is a front elevational view of the invention.

FIG. 1 is a front elevational view of the water-resistant clock 10, showing the clock's front casing 12, its crystal 14, with waterproofing gasket 16. Numerals 18 on the clock's face indicate the hours. Hour hand 20, minute hand 22, and second hand 24, rotate about central pivot 26. Three arms 28 extend from the clock's casing 12, spaced apart on the clock's circumference at equal 120 degree angles at digits 4, 8 and 12. On the rear side of each arm is a doubled suction cup 30, by which the clock may be attached to a wall or other suitable flat surface. Pull tabs 32 extending from each doubled suction cup 30 facilitate the removal of the doubled suction cups 30, and thereby the clock 10, from the surface to which it is adhered. Adhesion is improved by adding a film of water to the bottom surface of a doubled suction cup 30 or to the surface to which the clock 10 is to be attached.

Figure 2:
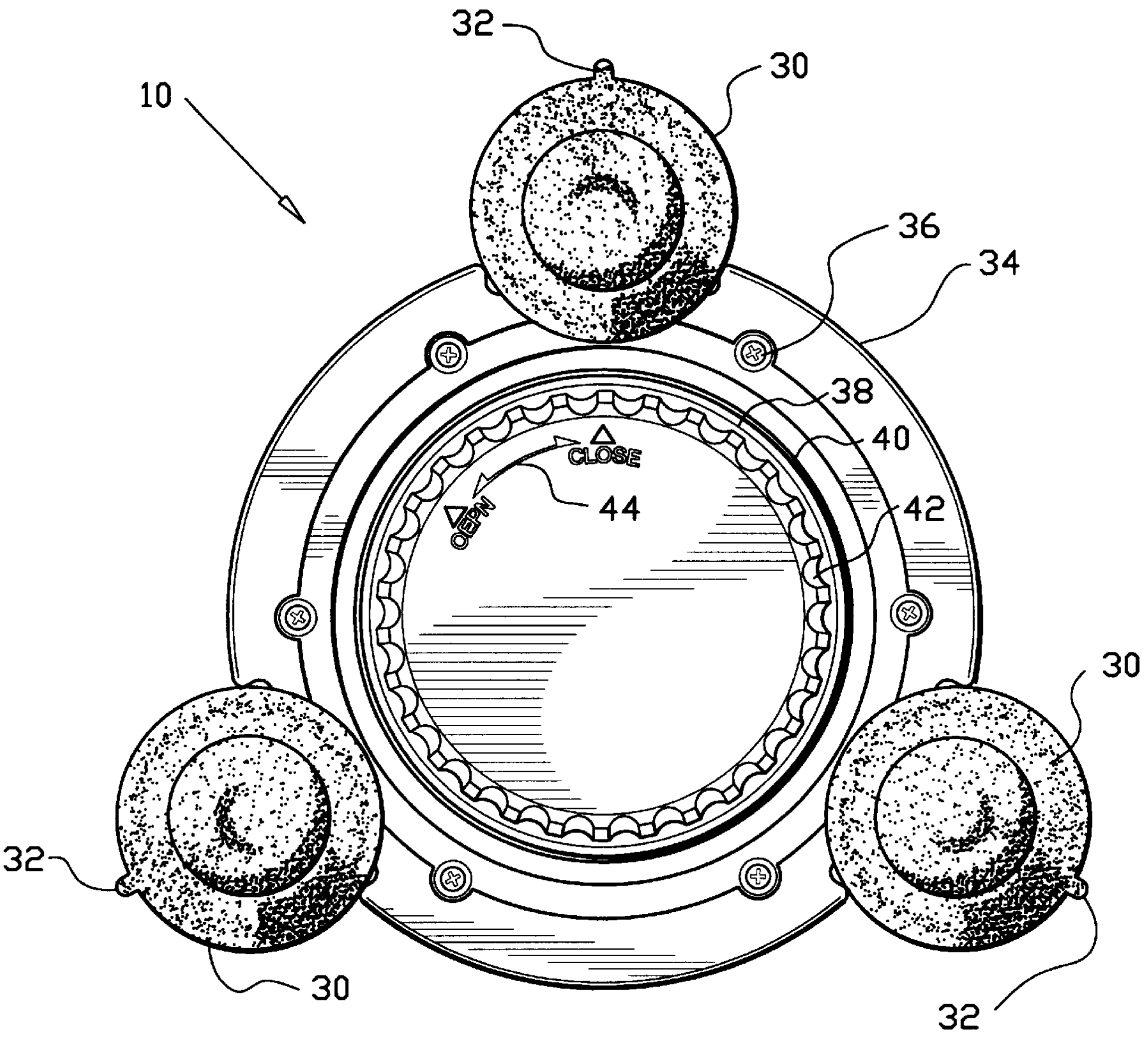
FIG. 2 is a rear elevational view of the invention, with the back cover in place.

FIG. 2 is a rear elevational view of the clock 10, with the back cover 38 in place, and showing the concave rear surfaces of the doubled suction cups 30 having a smaller diameter suction cup centered within the larger sized suction cup with pull tabs 32. The clock's rear casing 34 is fastened to the front casing in a waterproofing manner by screws 36. The back cover 38 fits against gasket 40 to form a watertight seal. Notches 42 around the circumference of the generally cylindrical back cover 38 make it easier to grip when turning it. Indicia 44 indicate the direction in which the back cover should be turned: clockwise to close it; counterclockwise to open it. Alternatively, the back cover could be configured so that it is turned counterclockwise to close it, and clockwise to open it.

Figure 3:
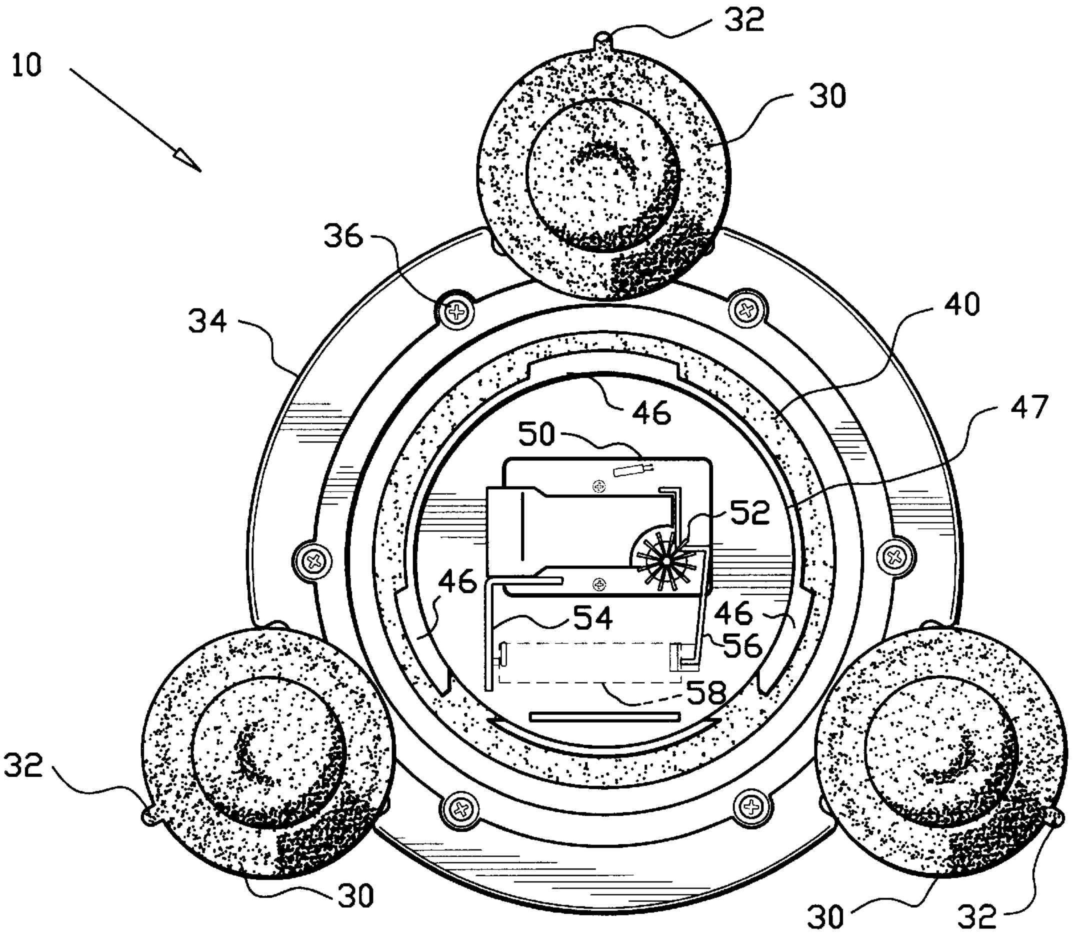
FIG. 3 is a rear elevational view of the invention, with the back cover removed.

FIG. 3 is a rear elevational view of the invention, with the back cover removed. The gasket 40, which is preferably made of rubber or a plastic with similar properties such as Kraton™, is partially covered by three outwardly extending arcuate prongs 46 on the movement housing 47. The removal of the back cover has exposed the clockworks, including a dial 52 for setting the time shown by the clock's hands. In the preferred embodiment, the clock is electrically powered, with a positive contact plate 54 and a negative contact plate 56 touching, respectively, positive and negative poles of a battery 58, which is shown in broken lines because it is not part of the claimed invention. It is within the ambit of the present invention to substitute other similar clockworks having the same dimensions with equivalent or additional features.

Figure 4:
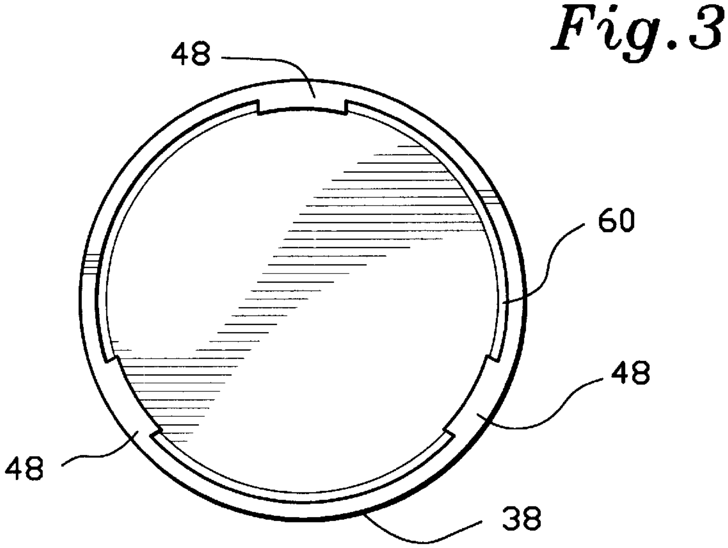
FIG. 4 is a front elevational view of the back cover.

FIG. 4 is a front elevational view of the back cover 38, showing its interior 60 that covers the clockworks when it is in place. Three inwardly extending arcuate prongs 48 engage the outwardly extending arcuate prongs 46 shown in FIG. 3 when the back cover is closed, creating a watertight seal that protects the clockworks.

Figure 5:
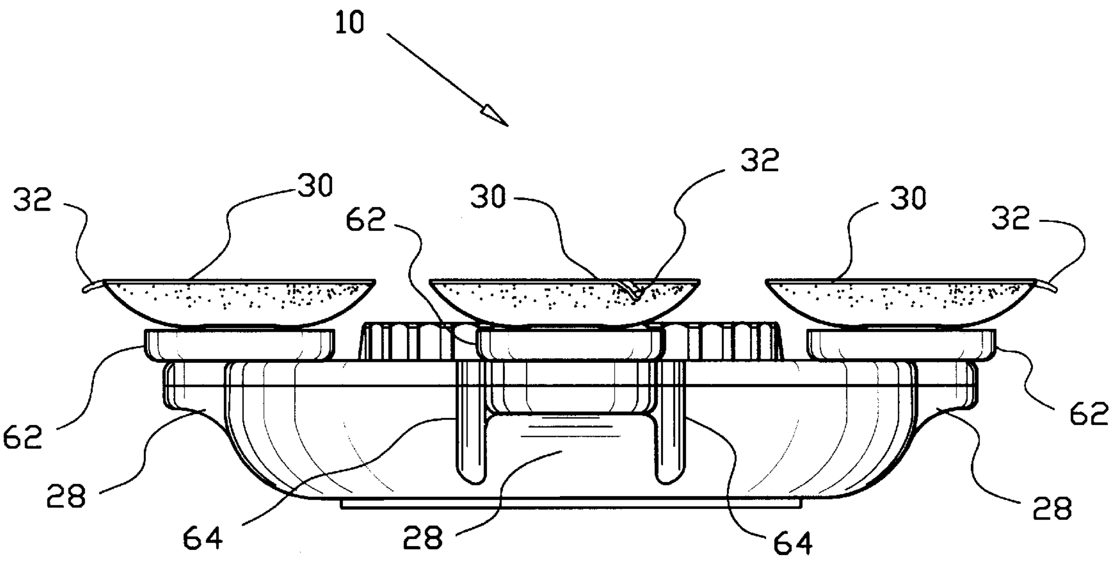
FIG. 5 is a side view of the invention.

FIG. 5 is a side view of the clock 10, showing front casing 12, rear casing 34, back cover 38, and three arms 28, each ending in sockets 62 that retain doubled suction cups 30 with the pull tabs 32. Grooves 64 on the side of each arm are an optional ornamental feature. Gasket 40 preferably protrudes approximately 0.5 mm. beyond the front casing 12. The doubled suction cups should be made of rubber or flexible plastic such as polyvinyl chloride or an injection molded elastomer, and be capable of retaining the clock on a smooth flat vertical surface for an extended period of time, as in a shower stall. The front casing 12, rear casing 34, and the back cover 38, are preferably made of light weight, water-resistant and break resistant plastic.

It is to be understood that the present invention is not limited to the sole embodiment described above, but encompasses any and all embodiments within the scope of the following claims.

I claim:

1. A clock comprising:

clockworks housed within a water-resistant casing, said casing including a main body having outwardly extending arcuate prongs and a back cover having inwardly extending arcuate prongs, wherein said outwardly extending prongs engage said inwardly extending when the back cover is closed;

a plurality of doubled suction cups positioned on said back cover by arms extending from the main body, wherein each of said plurality of doubled suction cups consists of a centered inner suction cup having a predetermined diameter integral with an outer suction cup having a larger diameter, whereby the clock may be removably retained on a suitable surface.

2. The clock according to claim 1, wherein the main body of the clock has a front side with a face having indicia and hour, minute and second hands.

3. The clock according to claim 1, wherein the the front side with the face being covered with a crystal sealed with a first circular gasket.

4. The clock according to claim 1, wherein each doubled suction cup has an outside tab, whereby release of the suction effect is effected by pulling on said tab.

5. The clock according to claim 4, wherein each doubled suction cup with its tab extends beyond the water-resistant casing, whereby the tab is accessible for removal of the clock from said suitable surface.

6. The clock according to claim 1, wherein there are three arms extending from the main body of the clock.

7. The clock according to claim 6, wherein the doubled suction cups are attached to each of the three arms.

8. The clock according to claim 7, wherein the main body of the clock is generally circular, and the arms extend radially outward and are spaced apart from each other at equal angles.

9. The clock according to claim 1, including a removable back cover, which covers the clockworks in a watertight manner when closed.

10. The clock according to claim 9, wherein the back cover is generally cylindrical, with a hollow interior, and one open circular end where it is attached to the main body when closed.

11. The clock according to claim 10, wherein the circumference of the open circular end of the back cover contacts a circular gasket attached to the main body, when the back cover is closed.

12. The clock according to claim 11, wherein said gasket protrudes from the casing to increase the watertightness of the clock.

13. The clock according to claim 1, wherein the back cover is configured and arranged so as to be closed by rotation in a clockwise direction, and opened by rotation in a counterclockwise direction.

14. The clock according to claim 1, wherein the back cover is configured and arranged so as to be closed by rotation in a counterclockwise direction, and opened by rotation in a clockwise direction.

15. The clock according to claim 1, wherein the clockworks further comprise and are powered by an electrical battery, which can be replaced when the back cover is open.

16. The clock according to claim 9, wherein said back cover having peripheral notches enabling a better grip for opening and closing said back cover.

* * * * *